United States Patent
Li et al.

(10) Patent No.: US 11,204,338 B2
(45) Date of Patent: Dec. 21, 2021

(54) LIQUID PHASE ANALYSIS DEVICE AND ANALYSIS METHOD FOR LIQUID PHASE ANALYSIS DEVICE

(71) Applicant: SHENZHEN MINDRAY BIO-MEDICAL ELECTRONICS CO., LTD., Shenzhen (CN)

(72) Inventors: Jiangbo Li, Shenzhen (CN); Jin Teng, Shenzhen (CN)

(73) Assignee: SHENZHEN MINDRAY BIO-MEDICAL ELECTRONICS CO., LTD., Shenzhen (CN)

( * ) Notice: Subject to any disclaimer, the term of this patent is extended or adjusted under 35 U.S.C. 154(b) by 119 days.

(21) Appl. No.: 16/733,195

(22) Filed: Jan. 2, 2020

(65) Prior Publication Data

US 2020/0141911 A1 May 7, 2020

Related U.S. Application Data

(63) Continuation of application No. PCT/CN2017/091908, filed on Jul. 5, 2017.

(51) Int. Cl.
*G01N 30/20* (2006.01)
*G01N 30/02* (2006.01)

(52) U.S. Cl.
CPC ....... *G01N 30/20* (2013.01); *G01N 2030/027* (2013.01)

(58) Field of Classification Search
CPC ............. G01N 30/20; G01N 2030/027; G01N 2030/207
USPC ...... 73/61.56, 61.59, 863.72, 863.73, 864.83
See application file for complete search history.

(56) References Cited

U.S. PATENT DOCUMENTS

2015/0040648 A1* 2/2015 Matsubara ............ G01N 30/24
73/61.56

FOREIGN PATENT DOCUMENTS

| CN | 1749750 A | 3/2006 |
|----|-----------|--------|
| CN | 103308610 A | 9/2013 |
| CN | 203490202 U | 3/2014 |
| CN | 205982189 U | 2/2017 |
| CN | 206292212 U | 6/2017 |
| EP | 2345896 A1 | 7/2011 |
| WO | 2016156153 A1 | 10/2016 |
| WO | 2017017765 A1 | 2/2017 |

* cited by examiner

*Primary Examiner* — Robert R Raevis
(74) *Attorney, Agent, or Firm* — Kory D. Christensen

(57) ABSTRACT

A liquid phase analysis device includes a first fluid supply system for driving a first fluid or a sample to be detected, a second fluid supply system for driving a second fluid, an injection valve connected to the second fluid supply system and the first fluid supply system, a chromatographic column connected to the injection valve, and a detector connected to the chromatographic column, wherein the chromatographic column is used for isolating components in the sample to be detected; the detector is used for detecting the components, isolated by the chromatographic column, in the sample to be detected; the injection valve is used for switching a flow path so as to communicate flow paths of the first fluid supply system and second fluid supply system with a flow path of the chromatographic column. The liquid phase analysis device simplifies the complexity of a system, thereby reducing the costs of implementation.

18 Claims, 14 Drawing Sheets

LIQUID PHASE ANALYSIS DEVICE AND ANALYSIS METHOD FOR LIQUID PHASE ANALYSIS DEVICE

CROSS-REFERENCE TO RELATED APPLICATIONS

This application is a continuation of Patent Cooperation Treaty Application No. PCT/CN2017/091908, filed on Jul. 5, 2017, the content thereof is hereby incorporated by reference in its entirety.

TECHNICAL FIELD

The present disclosure relates to the fields of biochemistry and medical analysis, in particular to a liquid phase analysis device and an analysis method for the liquid phase analysis device.

BACKGROUND

Liquid chromatography analysis technology has been widely used in the pharmaceutical industry, environmental monitoring, medicine, academia, national defence, forensic science and other fields. In order to deliver various eluents and samples to a chromatography column, the existing liquid chromatography analyzers usually need to be provided with a plurality of driving force supply units to provide driving forces and a plurality of switching valves to realize switching between different eluents, leading to increased complexity of the system and high implementation costs.

SUMMARY

In view of the above, it is necessary to provide a liquid phase analysis device and a working method thereof with a simplified system and low implementation costs.

In one aspect, the present disclosure provides a liquid phase analysis device, comprising: a first fluid supply system for driving a first fluid or a sample to be tested, a second fluid supply system for driving a second fluid, an injection valve connected to the second fluid supply system and the first fluid supply system, a chromatography column connected to the injection valve, and a detector connected to the chromatography column;

wherein the chromatography column is used for separating components in the sample to be tested;

the detector is used for detecting the components, separated by the chromatography column, in the sample to be tested;

the injection valve is used for switching flow paths to enable the first fluid supply system and the second fluid supply system to communicate with a flow path of the chromatography column;

by means of the switching of the flow paths of the injection valve, the first fluid supply system is respectively used for driving the sample to be tested and the first fluid to the injection valve; and the second fluid supply system is used for driving the second fluid to the injection valve and enabling the second fluid to respectively push the sample to be tested and the first fluid to the chromatography column and the detector; or, the second fluid supply system is used for driving the second fluid to the chromatography column and the detector.

The liquid phase analysis device according to an embodiment of the present disclosure may further include a metering part which is connected to the injection valve and is used for storing the sample to be tested or the second fluid provided by the first fluid supply system.

In the liquid phase analysis device according to an embodiment of the present disclosure, a partial metering mode of the metering part is used during loading of the sample to be tested, in which the loading amount is determined by an externally controlled amount of sample entering the metering part.

In the liquid phase analysis device according to an embodiment of the present disclosure, a full metering mode of the metering part is used during loading of the first fluid, in which the loading amount is determined by the volume of the metering part.

In the liquid phase analysis device according to an embodiment of the present disclosure, the injection valve is a six-way valve or a seven-way valve.

In the liquid phase analysis device according to an embodiment of the present disclosure, the first fluid supply system may include an injector for providing a driving force to drive the sample to be tested or the first fluid into the injection valve.

In the liquid phase analysis device according to an embodiment of the present disclosure, the injector may include a sample injector and a first fluid injector, the sample injector is used for providing a driving force to drive the sample to be tested to enter the injection valve, and the first fluid injector is used for providing a driving force to drive the first fluid to enter the injection valve.

In the liquid phase analysis device according to an embodiment of the present disclosure, the second fluid supply system may include a constant flow pump for providing a driving force to drive the second fluid into the injection valve or the chromatography column.

In the liquid phase analysis device according to an embodiment of the present disclosure, the liquid phase analysis device has only one single constant flow pump and only one single injection valve.

In the liquid phase analysis device according to an embodiment of the present disclosure, the first fluid supply system is further used for driving a cleaning liquid to clean a loading pipeline, including a pipeline for loading the sample to be tested or loading the first fluid.

The liquid phase analysis device according to an embodiment of the present disclosure may further include a controller for controlling the second fluid supply system, the first fluid supply system and the injection valve, during the supply of the sample to be tested, the first fluid and the second fluid supply, the controller sequentially performing the following steps:

controlling the injection valve to switch into fluid communication with the first fluid supply system, and controlling the first fluid supply system to provide a driving force to drive the sample to be tested to the injection valve;

controlling the injection valve to switch such that the second fluid supply system, the injection valve and the chromatography column are in fluid communication sequentially, and controlling the second fluid supply system to provide a driving force to drive the second fluid to the injection valve, while causing the second fluid to push the sample to be tested to the chromatography column and the detector;

controlling the injection valve to switch into fluid communication with the first fluid supply system, and controlling the first fluid supply system to provide a driving force to drive the first fluid to the injection valve; and controlling the injection valve to switch such that the second fluid supply system, the injection valve and the chromatography column are in fluid communication sequentially, and controlling the second fluid supply system to provide a driving force to drive the second fluid to the injection valve, while causing the second fluid to push the first fluid to the chromatography column and the detector.

Another aspect of the present disclosure further provides An analysis method for a liquid phase analysis device, the liquid phase analysis device comprising a first fluid supply system for driving a first fluid or a sample to be tested, a second fluid supply system for driving a second fluid, an injection valve connected to the second fluid supply system and the first fluid supply system, a chromatography column connected to the injection valve, and a detector connected to the chromatography column; and the analysis method comprising the following steps:

the first fluid supply system driving the sample to be tested to the injection valve;

the injection valve switching flow paths, and the second fluid supply system driving the second fluid to the injection valve and causing the second fluid to push the sample to be tested to the chromatography column and the detector;

the injection valve switching the flow paths, and the first fluid supply system driving the first fluid to the injection valve; and the injection valve switching the flow paths, and the second fluid supply system driving the second fluid and causing the second fluid to push the first fluid to the chromatography column and the detector.

In the analysis method for the liquid phase analysis device according to an embodiment of the present disclosure, the liquid phase analysis device may further include a metering part, and during loading of the sample to be tested, the loading amount of the sample to be tested is determined by an externally controlled amount of sample entering the metering part.

In the analysis method for the liquid phase analysis device according to an embodiment of the present disclosure, the liquid phase analysis device may further include a metering part, and during loading of the first fluid, the loading amount of the first fluid is determined by the volume of the metering part.

In the analysis method for the liquid phase analysis device according to an embodiment of the present disclosure, the first fluid supply system driving the sample to be tested or the first fluid to the injection valve may include: providing a driving force through an injector to drive the sample to be tested or the first fluid to enter the injection valve.

In the analysis method for the liquid phase analysis device according to an embodiment of the present disclosure, during loading of the sample to be tested, a driving force is provided by a sample injector to drive the sample to be tested to enter the injection valve; and during loading of the first fluid, a driving force is provided by a first fluid injector to drive the first fluid to enter the injection valve.

In the analysis method for the liquid phase analysis device according to an embodiment of the present disclosure, the second fluid supply system driving the second fluid to the injection valve may include: providing a driving force through a constant flow pump to drive the second fluid to the injection valve.

In the analysis method for the liquid phase analysis device according to an embodiment of the present disclosure, the analysis method may include:

controlling the injection valve to switch into fluid communication with the first fluid supply system, and controlling the first fluid supply system to provide a driving force to drive the sample to be tested to the injection valve;

controlling the injection valve to switch such that the second fluid supply system, the injection valve and the chromatography column are in fluid communication sequentially, and controlling the second fluid supply system to provide a driving force to drive the second fluid to the injection valve, while causing the second fluid to push the sample to be tested to the chromatography column and the detector;

controlling the injection valve to switch into fluid communication with the first fluid supply system, and controlling the first fluid supply system to provide a driving force to drive the first fluid to the injection valve; and controlling the injection valve to switch such that the second fluid supply system, the injection valve and the chromatography column are in fluid communication sequentially, and controlling the second fluid supply system to provide a driving force to drive the second fluid to the injection valve, while causing the second fluid to push the first fluid to the chromatography column and the detector.

The analysis method for the liquid phase analysis device according to an embodiment of the present disclosure may further include:

controlling the injection valve to switch into fluid communication with the first fluid supply system, and control ling the first fluid supply system to provide a driving force to drive cleaning liquid to clean a loading pipeline, including a pipeline for loading the sample to be tested or loading the first fluid.

Compared with the prior art, the liquid phase analysis device provided by the present disclosure uses the first supply system to supply the sample to be tested and the first fluid and the second supply system to supply the second fluid, and performs flow path switching through one injection valve, thereby realizing injection adsorption of the sample to be tested and elution of the sample to be tested by the fluid, respectively. According to the present disclosure, the complexity of the system is simplified, the number of instrument components is reduced, the performance requirements on the components are lowered, and the cost of the to instrument is reduced. In addition, the length of the flow path for the fluid to enter the chromatography column is reduced, the analysis time is less, the loss of the fluid in the flow path is also reduced, the fluctuation of the baseline during analysis is decreased, and the analysis accuracy is increased.

Figure 8:
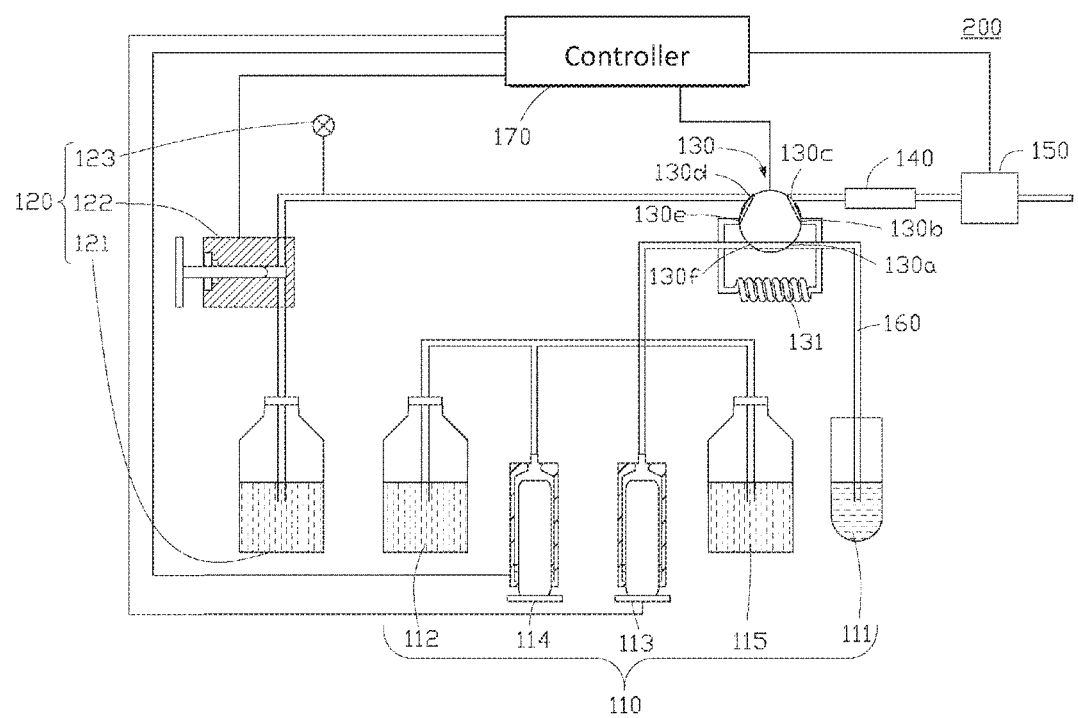
FIG. 8 is a system structure diagram of a liquid phase analysis device according to another embodiment of the present disclosure.

FIG. is a flowchart of an analysis method of the liquid phase analysis device shown in FIG. 8.

Figure 10:
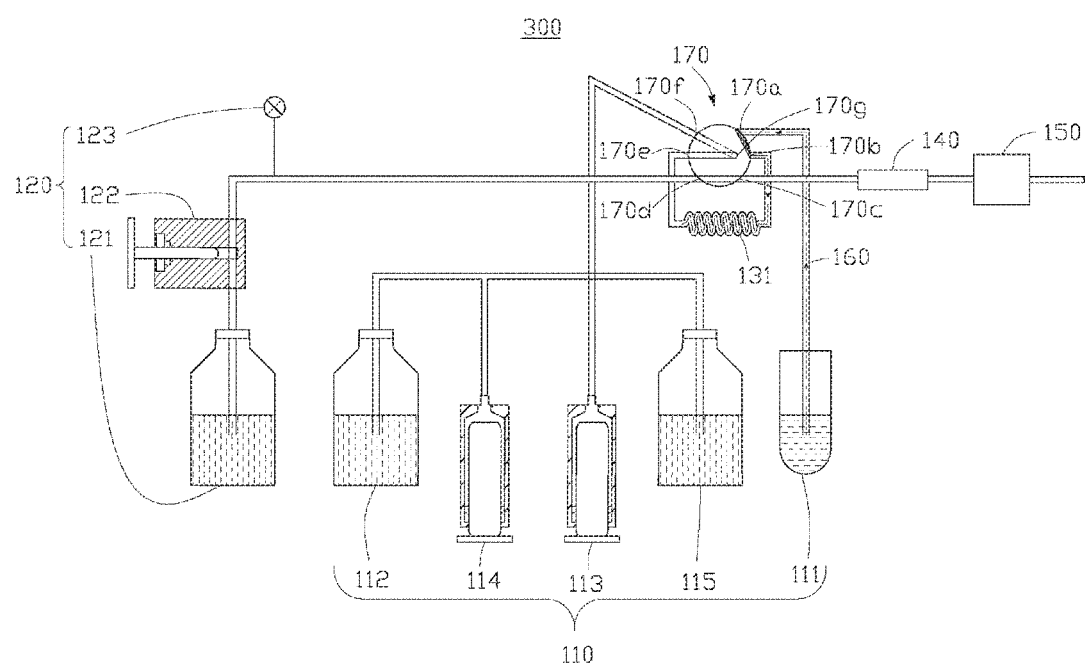

FIG. 10 is a system structure diagram of a liquid phase analysis device according to another embodiment of the present disclosure when a sample to be tested is being loaded.

Figure 11:
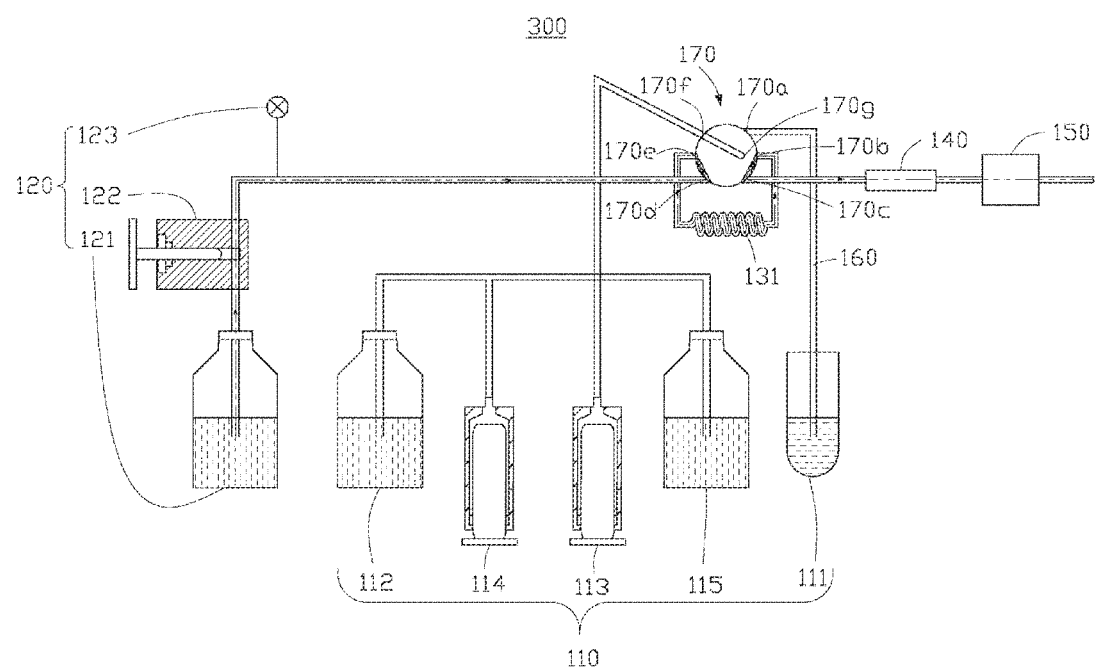

FIG. 11 is a system structure diagram of the liquid phase analysis device shown in FIG. 10 when the sample to be tested is being injected.

Figure 12:
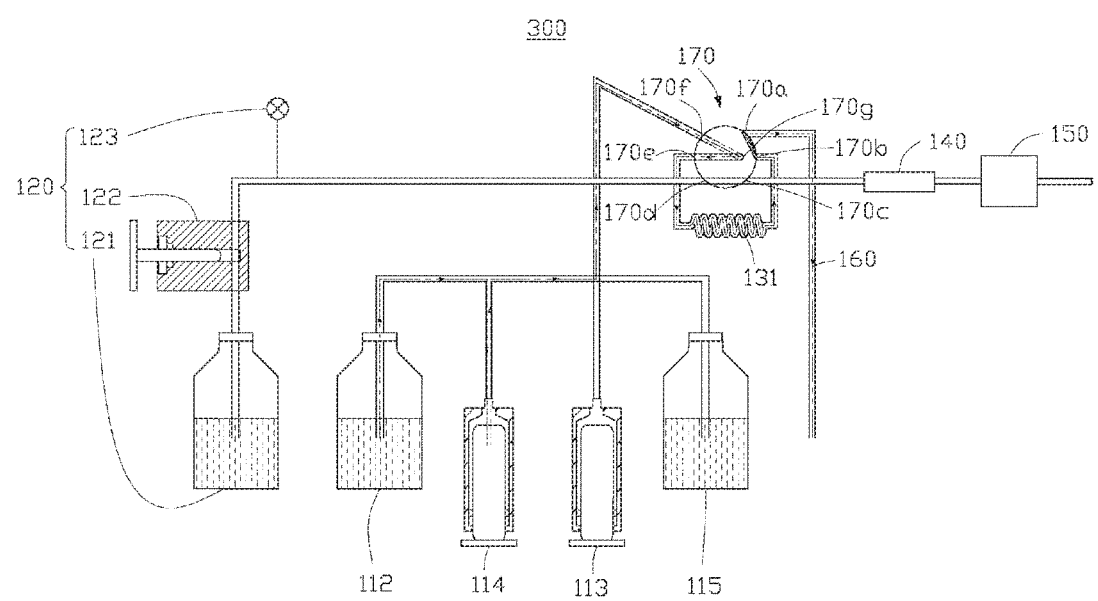

FIG. 12 is a system structure diagram of the liquid phase analysis device shown in FIG. 10 when a first fluid is being loaded.

Figure 13:
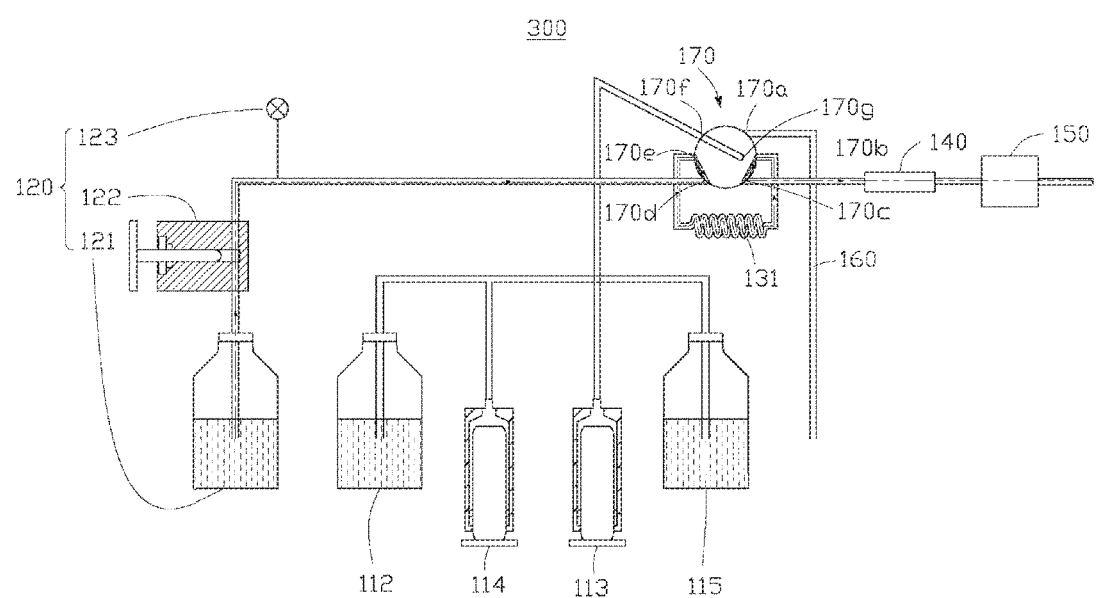

FIG. 13 is a system structure diagram of the liquid phase analysis device shown in FIG. 10 when the first fluid is being injected.

Figure 14:
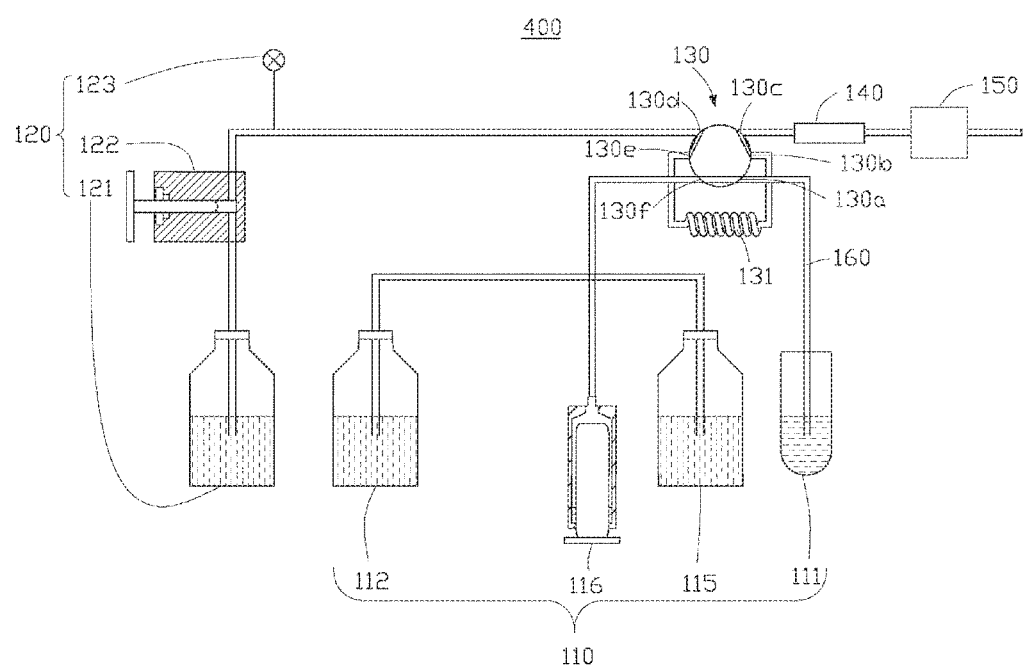

FIG. 14 is a system structure diagram of a liquid phase analysis device according to another embodiment of the present disclosure.

LIST OF REFERENCE SIGNS

TABLE 11

| Liquid phase analysis device | 100, 200, 300, 400 |
| --- | --- |
| First fluid supply system | 110 |
| Sample container | 111 |
| First fluid container | 112 |
| Sample injector | 113 |
| First fluid injector | 114 |
| Cleaning liquid container | 115 |
| Injector | 116 |
| Second fluid supply system | 120 |
| Second fluid container | 121 |
| Constant flow pump | 122 |
| Impulse damper | 123 |
| Injection valve | 130, 170 |
| Metering part | 131 |
| Port | 130a, 130b, 130c, 130d, 130e, 130f, 170a, 170b, 170c, 170d, 170e, 170f, 170g |
| Chromatography column | 140 |
| Detector | 150 |
| Sample or waste channel | 160 |
| Controller | 170 |

The following detailed description will further explain the present disclosure with reference to the above drawings.

DETAILED DESCRIPTION OF EMBODIMENTS

The "first" and "second" used in the present disclosure are only for convenience of description and reference, and cannot be understood as indicating or implying relative importance, or as having a sequential relationship.

In the present disclosure, the "loading" of a sample to be tested is to supply the sample to be tested to an injection valve and store same in a metering part; and the "loading" of a first fluid is to supply the first fluid to the injection valve and store same in the metering part. The "injection" is to supply the fluid in the metering part to a chromatography column.

The "liquid chromatography" in the present disclosure refers to separation by utilizing the difference in affinity, such as partition coefficient and adsorption ability, between various components in the sample to be tested in a liquid-solid two-phase. Due to the differences in properties and structures between the components, the magnitude and strength of the acting force generated between the components and the stationary phase are different. As the mobile phase moves, the mixture undergoes repeated distribution and balance between the two phases, so that the retention time of each component by the stationary phase is different, thus flowing out of the stationary phase successively in a certain order. The stationary is the stationary phase, and the liquid flowing through the stationary phase is the mobile phase.

Figure 1:
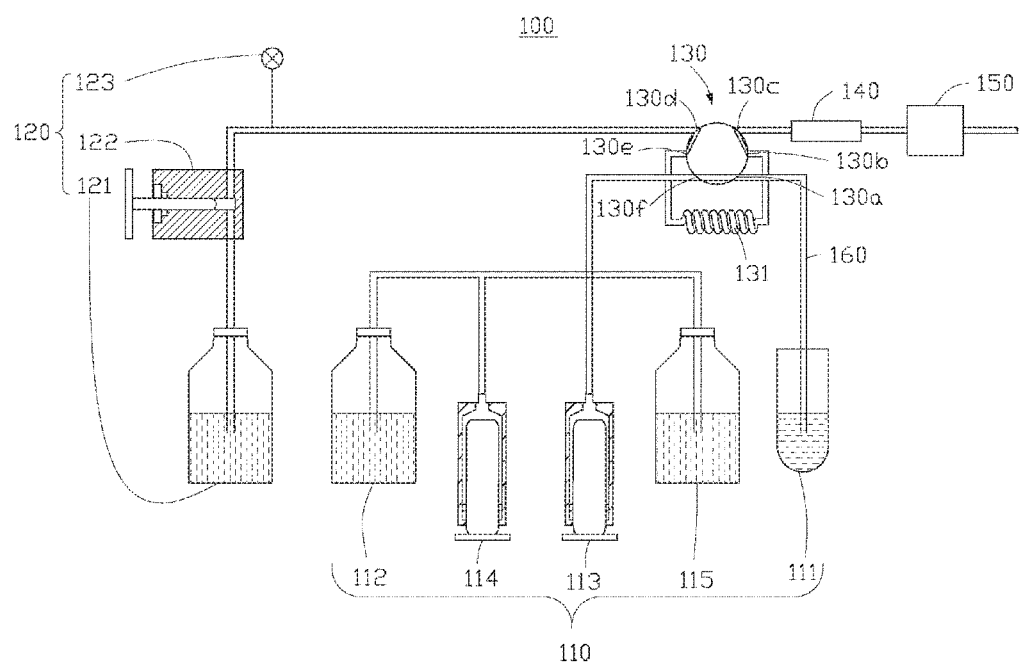
FIG. 1 is a system structure diagram of an embodiment of a liquid phase analysis device of the present disclosure.

Referring to FIG. 1, a liquid phase analysis device 100 according to a first preferred embodiment of the present disclosure mainly includes a first fluid supply system 110, a second fluid supply system 120, an injection valve 130, a chromatography column 140, and a detector 150.

The first fluid supply system 110 is configured to drive a sample to be tested or a first fluid to the injection valve 130. In this embodiment, the first fluid supply system 110 may include a sample injector 113 for providing a driving force to drive the sample in a sample container 111 to the injection valve 130 via a sample channel 160; and a first fluid injector 114 for providing a driving force to drive the first fluid in a first fluid container 112 to the injection valve 130. Those skilled in the art can understand that the driving force supply equipment may not be limited to an injector, and other devices capable of transferring a trace amount of liquid may also be used in the present disclosure. The sample may be, for example, a diluted blood sample of a subject. In addition, the sample and the first fluid may share one injector, that is, the sample injector 113 and the first fluid injector 114 may be combined into one injector.

The sample container 111 and the first fluid container 112 may be, for example, reagent bottles for storing the sample to be tested or the first fluid.

The second fluid supply system 120 is used for driving a second fluid to the injection valve 130 so that the second fluid pushes the sample to be tested or the first fluid to the chromatography column 140 and the detector 150. In this embodiment, the second fluid supply system 120 may include: a constant flow pump 122 for providing a driving force to drive the second fluid into the injection valve 130, and a pulse damper 123 for eliminating liquid pressure pulsation or flow pulsation in the pipeline on the fluid path of the second fluid flowing to the injection valve 130. The constant flow pump 122 has a reciprocating plunger, and the second fluid forms a continuous fluid path under the push of the constant flow pump 122. Those skilled in the art can understand that other forms of constant flow pumps are also applicable to the present disclosure, for example, a plunger pump can be used. As shown in FIG. 1, a second fluid container 121 holding the second fluid may be, for example, a reagent bottle.

In the above embodiment, the first fluid supply system uses an injector and the second fluid supply system uses a constant flow pump, both of which are driving force supply equipment. The main difference is that the driving force supply is different. Relatively speaking, the first fluid supply system uses lower pressure driving force supply equipment while the second fluid supply system uses higher pressure driving force supply equipment. That is, in the two fluid supply systems, the first fluid supply system is a lower pressure supply system and the second fluid supply system is a higher-pressure supply system.

The injection valve 130 is used for switching flow paths to enable the first fluid supply system 110 and the second fluid supply system 120 to communicate with a flow path of the chromatography column 140.

The injection valve 130 is, for example, an n-way switching valve (n>2). Further, the injection valve 130 is, for example, an inlet valve, a three-way valve, a four-way valve, a five-way valve, a six-way valve, a seven-way valve, etc., and has a structure capable of switching flow paths smoothly. In this embodiment, the injection valve 130 is a six-way valve having ports 130a, 130b, 130c, 130d, 130e and 130f. By rotating the injection valve, the pipes connecting two of the ports can communicate with each other. These ports 130a, 130b, 130c, 130d, 130e and 130f may be connected to separate flow paths, respectively.

In one embodiment, the liquid phase analysis device has only one single constant flow pump 122 and one single injection valve 130.

In one embodiment, the liquid phase analysis device may further include a metering part 131. The metering part 131 is connected to the injection valve 130. It is understood that the metering part 131 may be a metering loop. The metering part 131 is used for storing the sample to be tested or the first fluid provided by the first fluid supply system 110.

In one embodiment, the metering part 131 has a certain volume. During loading of the first fluid, the injection volume of the first fluid is determined by the volume of the metering part 131, i.e. the first fluid is loaded in a full metering mode of the metering part.

In one embodiment, the volume of the metering part in this case should be less than or equal to the loading amount of the first fluid.

In one embodiment, the sample injector 113 has a certain volume. During loading of the sample to be tested, the injector 113 can control the loading amount of the sample to be tested, i.e. the sample to be tested is loaded in a partial metering mode of the metering part.

In one embodiment, the volume of the metering part in this case should be greater than or equal to the loading amount of the sample to be tested.

In this embodiment, the chromatography column 140 is filled with a stationary phase for separating components in the sample to be tested. The detector 150 is used for detecting absorbance of the components in the sample to be tested that are separated from the chromatography column 140.

In this embodiment, the sample channel 160 can be used as a waste channel at the same time, that is, after the sample is loaded, the sample container 111 can be removed or used as a waste receiving tube, so that the sample channel can be used as a waste channel, and can be used for discharging excess first fluid or other fluids after being metered by the metering part 131.

In this embodiment, the first fluid supply system may further include a cleaning liquid container 115 for storing cleaning liquid. The sample injector 113 can also be used to provide a driving force to drive the cleaning liquid in the cleaning liquid container 115 to a loading pipeline and clean the loading pipeline, wherein the loading pipeline is a pipeline for loading the sample to be tested or the first fluid.

The present disclosure also provides an analysis method for the liquid phase analysis device 100. The following description is given with reference to FIGS. 2-8.

First, each port of the injection valve is connected to the corresponding pipeline. Specifically, port 130a of the injection valve is connected to the sample (waste) channel 160, ports 130b and 130e are connected to the metering part 131, port 130c is connected to the chromatography column 140, port 130d is connected to the first fluid supply system 110, and port 130f is connected to the second fluid supply system 120.

Figure 2:
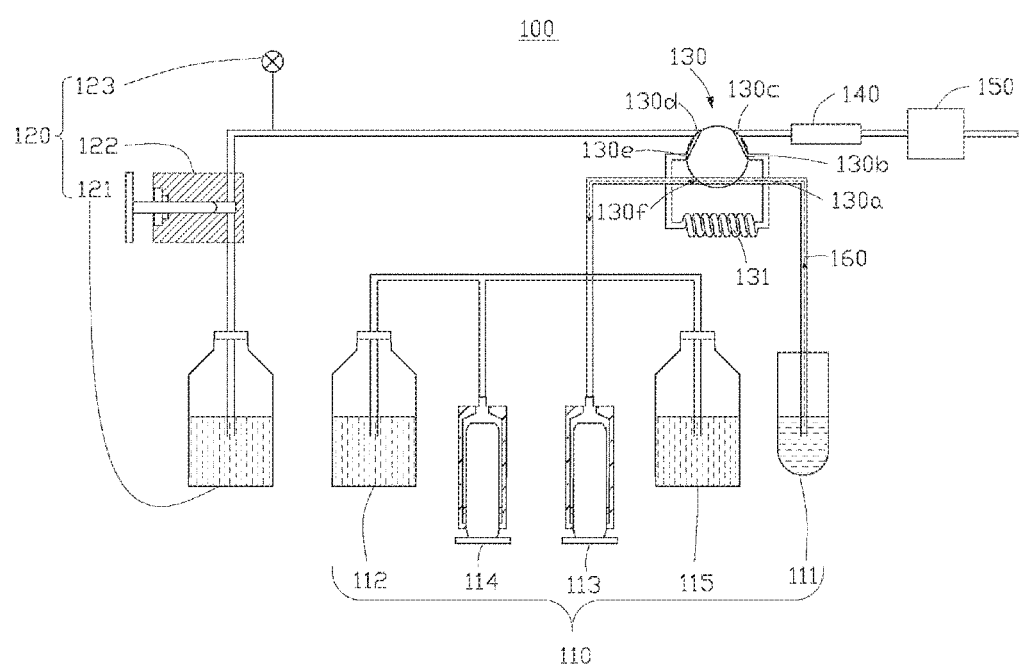
FIG. 2 is a system structure diagram of the liquid phase analysis device shown in FIG. 1 when a sample to be tested is ready to be loaded.

As shown in FIG. 2, the liquid phase analysis device 100 is loading a sample to be tested. The injection valve 130 rotates such that, in the injection valve, ports 130a and 130f are connected, ports 130b and 130c are connected, and ports 130d and 130e are connected.

In such a connection state, the sample injector 113 in the first fluid supply system 110 supplies the sample to be tested in the sample container 111 to the injection valve 130 via the sample channel 160 (the pipeline between the injection valve 130 and the sample injector 113), in preparation for the sample to be supplied from the sample container 111 to the metering part 131.

Figure 3:
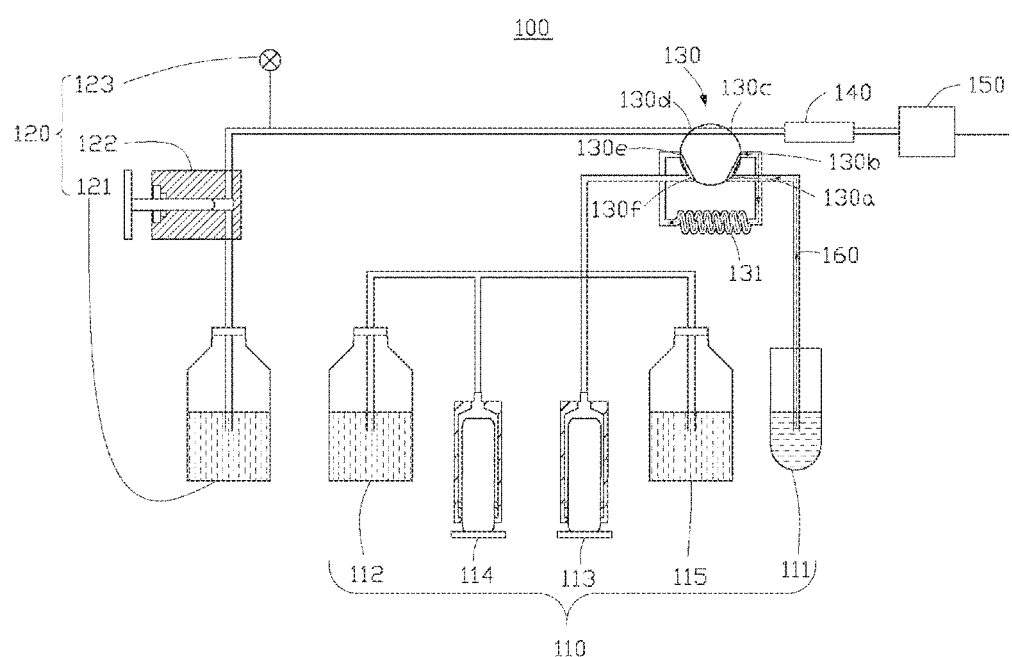
FIG. 3 is a system structure diagram of the liquid phase analysis device shown in FIG. 1 when the sample to be tested is being loaded.

Then, the connection state between the ports of the injection valve is switched. As shown in FIG. 3, the connection state between the ports is switched such that ports 130a and 130b are connected to each other, ports 130c and 130d are connected to each other, and ports 130e and 130f are connected to each other. In this case, a driving force continues to be supplied by the injector 113, and the sample in the sample container 111 is supplied to the metering part 131, thereby completing the loading of the sample to be tested. The injector 113 not only supplies a driving force, but also controls the metering of the sample to be tested.

In one embodiment, the volume of the metering part 131 is set to be greater than or equal to the loading amount of the sample to be tested, a certain amount of the sample to be tested is stored in the metering part 131, and the loading amount of the sample to be tested only accounts for a part of the volume of the metering part 131, i.e. the sample to be tested is metered by a portion of the metering part when loaded. In the case of partial metering, the injector 113 controls the loading amount.

Figure 4:
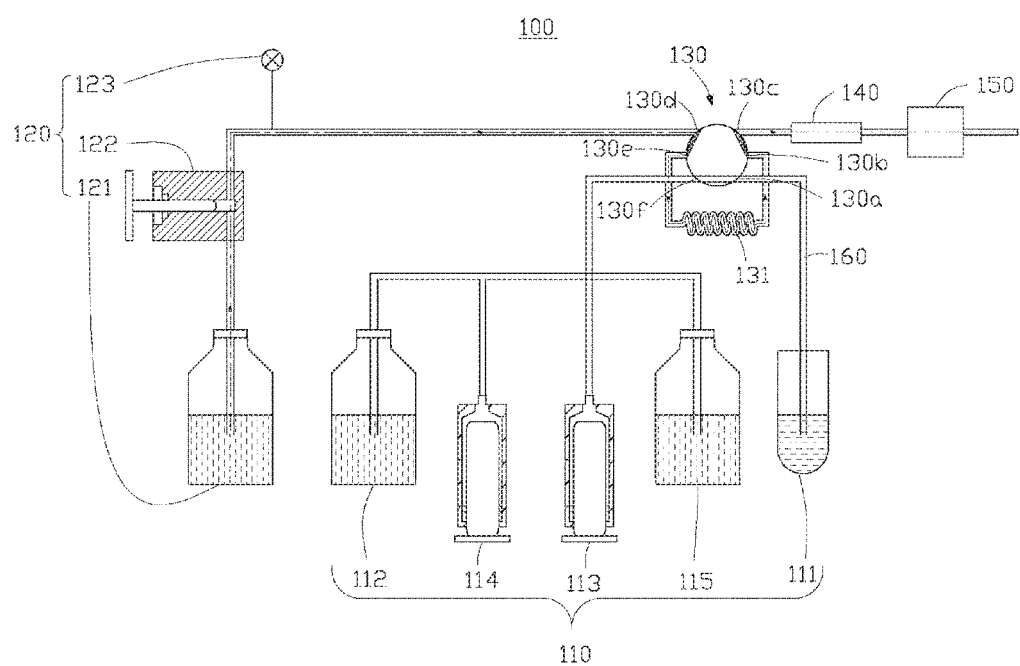
FIG. 4 is a system structure diagram of the liquid phase analysis device shown in FIG. 1 when the sample to be tested is being injected.

Next, the connection state between the ports of the injection valve is switched. As shown in FIG. 4, the connection state between the ports is switched such that ports 130a and 130f are connected, ports 130b and 130c are connected, and ports 130d and 130e are connected. In this state, the constant flow pump 122 of the second fluid supply system 120 supplies a driving force to supply the second fluid to the metering part 131 through ports 130d and 130e. Next, under the further drive of the constant flow pump 122, the second fluid pushes the sample to be tested to enter the chromatography column 140 through ports 130b and 130c of the injection valve, and the sample to be tested flows through the chromatography column 140, thus completing the injection of the sample to be tested.

The sample to be tested passes through a chromatography column and is adsorbed by the stationary phase under the push of the second fluid. In order to improve the separation effect of the target substance and impurities in the sample to be tested, the constant flow pump 122 provides a driving force to make the second fluid pass through the chromatography column 140 to carry out column balance and remove impurities with poor adsorption.

Figure 5:
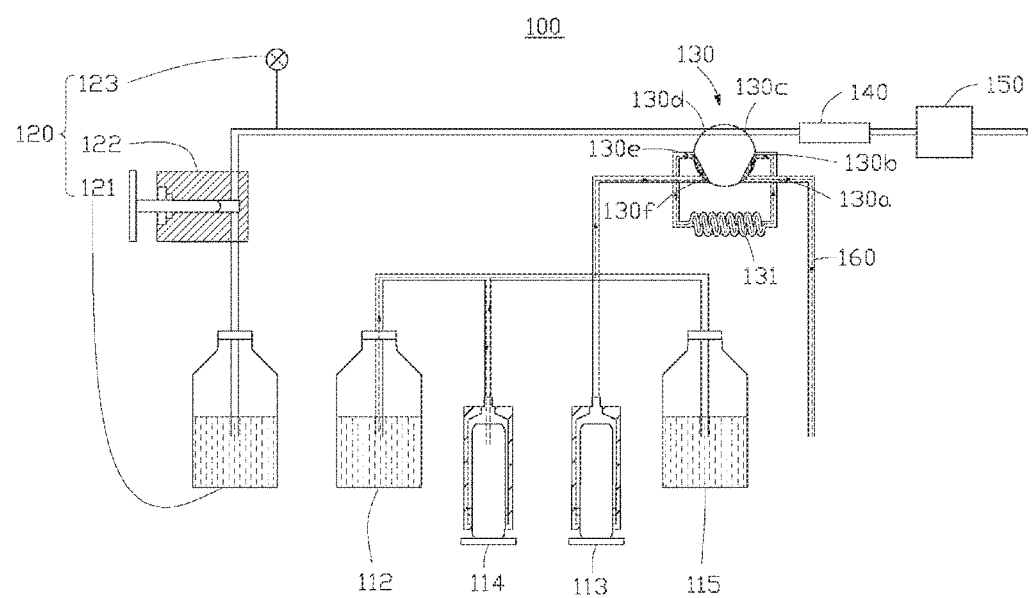
FIG. 5 is a system structure diagram of the liquid phase analysis device shown in FIG. 1 when a first fluid is being loaded.

After the column is balanced, the connection state between the ports of the injection valve is switched. As shown in FIG. 5, the connection state between the ports is switched such that ports 130a and 130b are connected, ports 130c and 130d are connected, and ports 130e and 130f are connected. In this state, the first fluid supply system 110 supplies the first fluid to the metering part 131 to complete the loading of the first fluid. Specifically, this operation is powered by the first fluid injector 114 in the first fluid supply system 110, and the first fluid loaded is metered by the metering part 131.

In one embodiment, the volume of the metering part 131 is set to be less than or equal to the loading amount of the first fluid. The metering part 131 is fully filled with the first fluid, and the surplus first fluid flows out through the waste channel 160 (refer to FIG. 5, the original sample channel 160 is used as the waste channel at this stage as the sample container 111 is removed), i.e. the full metering mode of the metering part is used during loading of the first fluid. In the case of full metering, the volume of the metering part 131 determines the loading amount.

Figure 6:
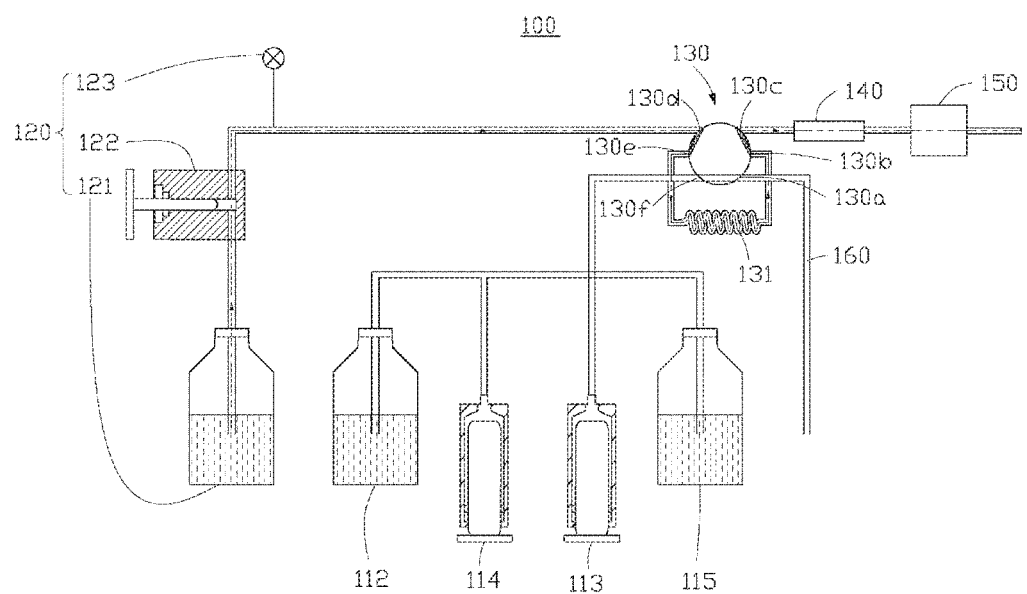
FIG. 6 is a system structure diagram of the liquid phase analysis device shown in FIG. 1 when the first fluid is being injected.

After the loading of the first fluid of is finished, the connection state between the ports of the injection valve is switched. As shown in FIG. 6, the connection state between the ports is switched such that ports 130a and 130f are connected to each other, ports 130b and 130c are connected to each other, and ports 130d and 130e are connected to each other. In this state, the constant flow pump 122 of the second fluid supply system 120 provides a driving force to supply the second fluid to the metering part 131, and causes the second fluid to push the first fluid into the chromatography column 140 through ports 130b and 130c of the injection valve 130. The first fluid elutes the target substance attached to the stationary phase of the chromatography column 140, and then the chromatography column 140 is column balanced by the second fluid so that the chromatography column 140 etc. are ready for the next analysis.

Figure 7:
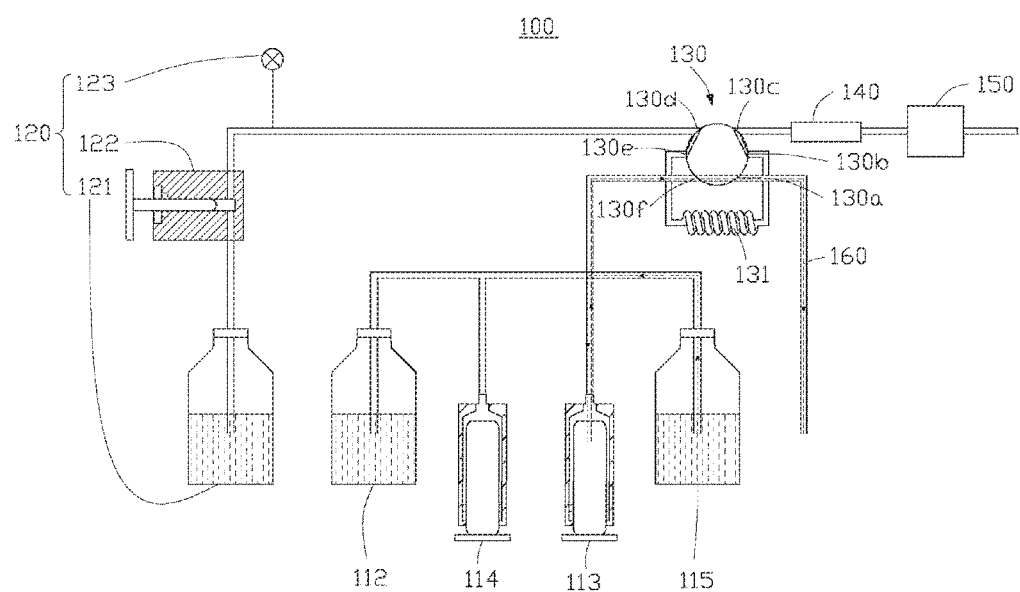
FIG. 7 is a system structure diagram of the liquid phase analysis device shown in FIG. 1 during cleaning with cleaning liquid.

After the injection of the first fluid is finished, the connection state between the ports of the injection valve is switched again. As shown in FIG. 7, the connection state between the ports is switched such that ports 130a and 130f are connected to each other, ports 130b and 130c are connected to each other, and ports 130d and 130e are connected to each other. With the driving force provided by the sample injector 113, the cleaning liquid in the cleaning liquid container 115 is driven into a loading pipeline to clean the loading pipeline. The loading pipeline is the pipeline for loading the sample to be tested or the first fluid. After the cleaning has been completed, the cleaning liquid can be discharged from the waste channel 160.

It can be understood that the present disclosure can manually control the operations, such as the supply, switching or detection, of each system. It is also possible to configure its own controller in each of the above systems to control the operations, such as supply, switching or detection, of each system. In a second preferred embodiment of the present disclosure, as shown in FIG. 8, a liquid phase analysis device 200 of the present disclosure is provided with a controller 170 independent of the above systems. The controller 170 is connected to the sample injector 113 and the first fluid injector 114 in the first fluid supply system 110, the constant flow pump 122 in the second fluid supply system 120, the injection valve 130, the chromatography column 140 and the detector 150, respectively, and controls the corresponding operations, such as supply, switching or detection, of each system.

Figure 9:
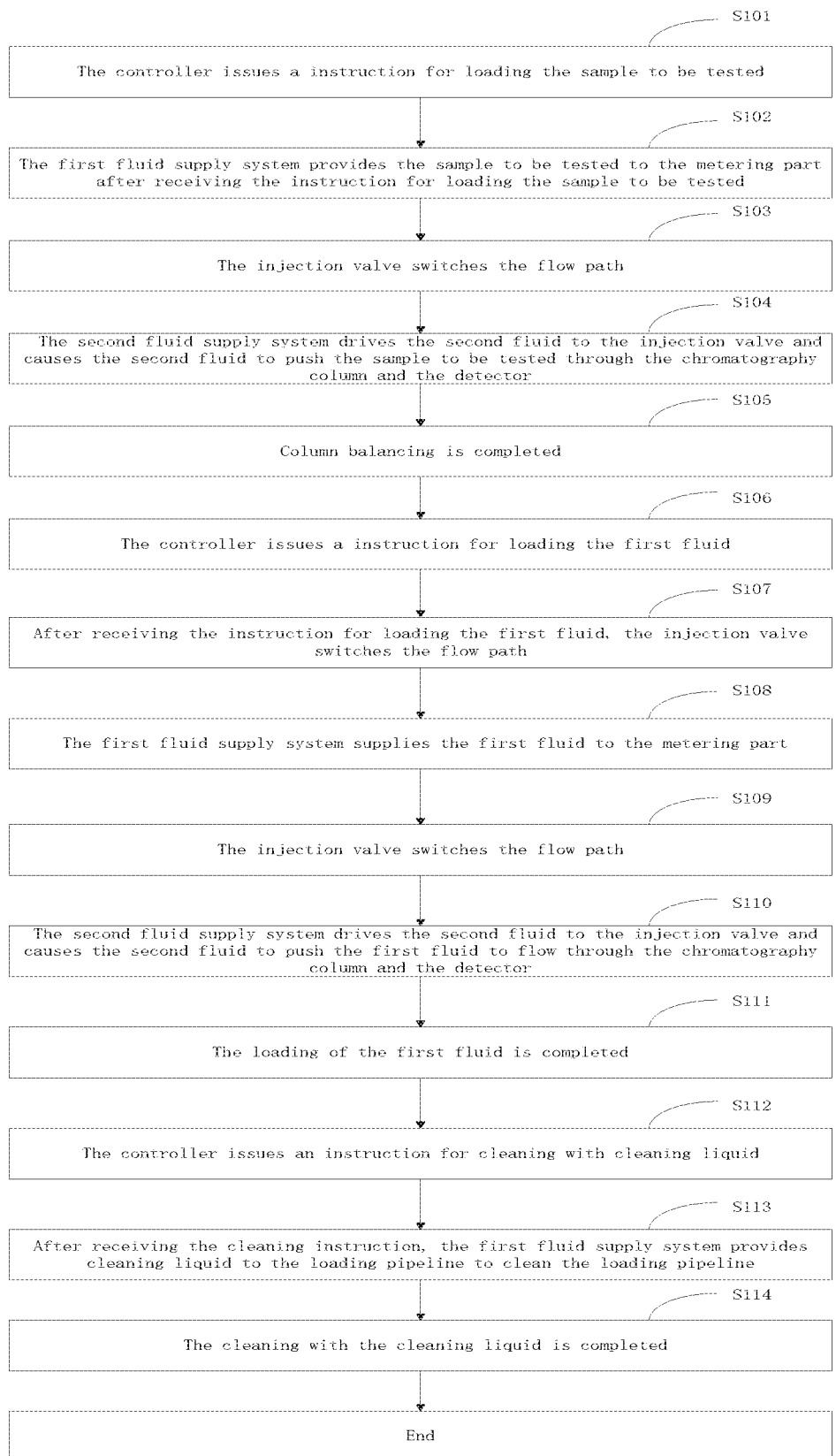

The present disclosure also provides an analysis method for the liquid phase analysis device 200. Referring to FIG. 9, at step S101, the controller issues a instruction for loading the sample to be tested; at step S102, the first fluid supply system provides the sample to be tested to the metering part after receiving the instruction for loading the sample to be tested; at step S103, the injection valve switches the flow path; at step S104, the second fluid supply system drives the second fluid to the injection valve and causes the second fluid to push the sample to be tested through the chromatography column and the detector; at step S105, column balancing is completed; at step S106, the controller issues a instruction for loading the first fluid; at step S107, after receiving the instruction for loading the first fluid, the injection valve switches the flow path; at step S108, the first fluid supply system supplies the first fluid to the metering part; at step S109, the injection valve switches the flow path; at step S110, the second fluid supply system drives the second fluid to the injection valve and causes the second fluid to push the first fluid to flow through the chromatography column and the detector; at step S111, the loading of the first fluid is completed; at step S112, the controller issues an instruction for cleaning with cleaning liquid; at step S113, after receiving the cleaning instruction, the first fluid supply system provides cleaning liquid to the loading pipeline to clean the loading pipeline; and at step S114, the cleaning with the cleaning liquid is completed, and the entire analysis process is ended.

Referring to FIG. 10, the present disclosure also provides a system structure diagram of a liquid phase analysis device 300 according to a third preferred embodiment.

The first fluid supply system 110, the second fluid supply system 120, the metering part 131, the chromatography column 140, and the detector 150 described are basically identical in structure to those of the first preferred embodiment. The difference is that the injection valve 170 is a seven-way valve. The injection valve 170 has ports 170a, 170b, 170c, 170d, 170e, 170f and 170g.

The analysis method of the liquid phase analysis device 300 and the functions of the systems are similar to those of the liquid phase analysis device 100, see FIGS. 10-13 for details.

As shown in FIG. 10, each port of the injection valve is connected to a corresponding pipeline. Specifically, port 170a of the injection valve is connected to the sample (waste) channel 150, ports 170b and 170e are connected to the metering part 131, port 170c is connected to the chromatography column 140, port 170d is connected to the second fluid supply system 120, and port 170g is connected to the first fluid supply system 110.

When the liquid phase analysis device 300 loads the sample to be tested, the injection valve 170 rotates such that ports 170a and 170b of the injection valve are connected to each other, ports 170d and 170c are connected to each other, and ports 170g and 170e are connected to each other.

In such a state, the first fluid supply system 110 supplies the sample to be tested to the metering part 131 to complete the loading of the sample to be tested.

Then, as shown in FIG. 11, the connection state between the ports of the injection valve is switched by switching the injection valve 170 such that ports 170b and 170c are connected to each other, ports 170d and 170e are connected to each other, and ports 170g and 170f are connected to each other.

In such a state, the constant flow pump 122 of the second fluid supply system 120 supplies a driving force to supply the second fluid to the metering part 131 through ports 170d and 170e. Next, under the further drive of the constant flow pump 122, the second fluid pushes the sample to be tested to enter the chromatography column 140 through ports 170b and 170c of the injection valve, and the sample to be tested flows through the chromatography column 140, thus completing the injection of the sample to be tested.

The sample to be tested passes through a chromatography column and is adsorbed by the stationary phase under the push of the second fluid. In order to improve the separation effect of the target substance and impurities in the sample to be tested, the constant flow pump 122 provides a driving force to make the second fluid pass through the chromatography column 140 to carry out column balance and remove impurities with poor adsorption.

After the column is balanced, as shown in FIG. 12, the connection state between the ports of the injection valve is switched. The connection state between the ports is switched such that ports 170a and 170b are connected to each other, ports 170d and 170c are connected to each other, and ports 170g and 170e are connected to each other. In this state, the first fluid supply system 110 supplies the first fluid to the metering part 131 to complete the loading of the first fluid.

Then, after the loading of the first fluid is completed, the connection state between the ports of the injection valve is switched again. As shown in FIG. 13, the connection state between the ports is switched such that ports 170b and 170c are connected to each other, ports 170d and 170e are connected to each other, and ports 170g and 170f are connected to each other. In this state, the constant flow pump 122 of the second fluid supply system 120 provides a driving force to supply the second fluid to the injection valve 170 and further to the metering part 131. Next, under the further drive of the constant flow pump 122, the second fluid pushes the first fluid into the chromatography column 140 through ports 170b and 170c of the injection valve 170.

Referring to FIG. 14, the present disclosure also provides a system structure diagram of a liquid phase analysis device 400 according to a fourth preferred embodiment.

The second fluid supply system 120, the injection valve 130, the metering part 131, the chromatography column 140, and the detector 150 described are basically identical in structure to those of the first preferred embodiment. The difference is that the first fluid supply system 110 may include only one injector 116.

The analysis method of the liquid phase analysis device 400 and the functions of the systems are similar to those of the liquid phase analysis device 100, except that the sample in the sample container 111 and the first fluid in the first fluid container 112 are both driven by the injector 116 to be forced to the injection valve.

The embodiments described above are preferred embodiments of the present disclosure, but implementations of the present disclosure are not limited to the embodiments described above, which are used only for explaining the claims. However, the scope of protection of the present disclosure is not limited to the description. Any changes or substitutions that can easily occur to those skilled in the art within the technical scope disclosed by the present disclosure are included in the scope of protection of the present disclosure.

What is claimed is:

1. A liquid phase analysis device, comprising:
   a first fluid supply system for driving a first fluid or a sample to be tested;
   a second fluid supply system for driving a second fluid;
   an injection valve connected to the second fluid supply system and the first fluid supply system;
   a chromatography column connected to the injection valve; and
   a detector connected to the chromatography column,
   wherein the first fluid supply system is further configured to drive the sample to be tested to the injection valve,
   wherein the second fluid supply system is further configured to drive the second fluid to the injection valve after the injection valve switching flow paths, which causes the second fluid to push the sample to be tested to the chromatography column and the detector,
   wherein the first fluid supply system is further configured to drive the first fluid to the injection valve after the injection valve switching the flow paths, and
   wherein the second fluid supply system is further configured to drive the second fluid to the injection valve after the injection valve switching the flow paths, which causes the second fluid to push the first fluid to the chromatography column and the detector.

2. The liquid phase analysis device of claim 1, further comprising a metering part which is connected to the injection valve and is configured to store the sample to be tested or the first fluid provided by the first fluid supply system.

3. The liquid phase analysis device of claim 2, wherein the metering part is configured, during loading of the sample to be tested, to determine a loading amount by an externally controlled amount of sample entering the metering part.

4. The liquid phase analysis device of claim 2, wherein the metering part is configured, during loading of the first fluid, to determine a loading amount by a volume of the metering part.

5. The liquid phase analysis device of claim 1, wherein the first fluid supply system comprises at least one injector for providing a driving force to drive the sample to be tested or the first fluid into the injection valve.

6. The liquid phase analysis device of claim 5, wherein the at least one injector comprises a sample injector and a first fluid injector, the sample injector is configured to provide a driving force to drive the sample to be tested to enter the injection valve, and the first fluid injector is configured to provide a driving force to drive the first fluid to enter the injection valve.

7. The liquid phase analysis device of claim 1, wherein the second fluid supply system comprises a constant flow pump for providing a driving force to drive the second fluid into the injection valve or the chromatography column.

8. The liquid phase analysis device of claim 7, wherein the liquid phase analysis device has only one single constant flow pump and only one single injection valve.

9. The liquid phase analysis device of claim 1, wherein the first fluid supply system is further configured to drive a cleaning liquid to clean a loading pipeline, which comprises a pipeline for loading the sample to be tested or the first fluid.

10. The liquid phase analysis device of claim 1, further comprising a controller for controlling the second fluid supply system, the first fluid supply system and the injection valve, during the supply of the sample to be tested, the first fluid and the second fluid, the controller performing the following steps:
    controlling the injection valve to switch into fluid communication with the first fluid supply system, and controlling the first fluid supply system to provide a driving force to drive the sample to be tested to the injection valve;
    controlling the injection valve to switch such that the second fluid supply system, the injection valve and the chromatography column are in fluid communication sequentially, and controlling the second fluid supply system to provide a driving force to drive the second fluid to the injection valve, while causing the second fluid to push the sample to be tested to the chromatography column and the detector;
    controlling the injection valve to switch into fluid communication with the first fluid supply system, and controlling the first fluid supply system to provide a driving force to drive the first fluid to the injection valve; and controlling the injection valve to switch such that the second fluid supply system, the injection valve and the chromatography column are in fluid communication sequentially, and controlling the second fluid supply system to provide a driving force to drive the second fluid to the injection valve, while causing the second fluid to push the first fluid to the chromatography column and the detector.

11. An analysis method performed using a liquid phase analysis device, the liquid phase analysis device comprising a first fluid supply system for driving a first fluid or a sample to be tested, a second fluid supply system for driving a second fluid, an injection valve connected to the second fluid supply system and the first fluid supply system, a chromatography column connected to the injection valve, and a detector connected to the chromatography column, wherein the analysis method comprises the following steps:

driving the sample to be tested to the injection valve by using the first fluid supply system;

driving the second fluid to the injection valve by using the second fluid supply system after the injection valve switching flow paths, which causes the second fluid to push the sample to be tested to the chromatography column and the detector;

driving the first fluid to the injection valve by using the first fluid supply system after the injection valve switching the flow paths; and driving the second fluid to the injection valve by using the second fluid supply system after the injection valve switching the flow paths, which causes the second fluid to push the first fluid to the chromatography column and the detector.

12. The analysis method of claim 11, wherein the liquid phase analysis device further comprises a metering part, and during loading of the sample to be tested, a loading amount of the sample to be tested is determined by an externally controlled amount of sample entering the metering part.

13. The analysis method of claim 11, wherein the liquid phase analysis device further comprises a metering part, and during loading of the first fluid, a loading amount of the first fluid is determined by the volume of the metering part.

14. The analysis method of claim 11, wherein driving the sample to be tested or the first fluid to the injection valve by using the first fluid supply system comprises:

providing a driving force through an injector to drive the sample to be tested or the first fluid to enter the injection valve.

15. The analysis method of claim 14, wherein during loading of the sample to be tested, a driving force is provided by a sample injector to drive the sample to be tested to enter the injection valve; and during loading of the first fluid, a driving force is provided by a first fluid injector to drive the first fluid to enter the injection valve.

16. The analysis method of claim 11, wherein driving the second fluid to the injection valve by using the second fluid supply system comprises: providing a driving force through a constant flow pump to drive the second fluid to the injection valve.

17. The analysis method of claim 11, wherein the analysis method comprises:

controlling the injection valve to switch into fluid communication with the first fluid supply system, and controlling the first fluid supply system to provide a driving force to drive the sample to be tested to the injection valve;

controlling the injection valve to switch such that the second fluid supply system, the injection valve and the chromatography column are in fluid communication sequentially, and controlling the second fluid supply system to provide a driving force to drive the second fluid to the injection valve, while causing the second fluid to push the sample to be tested to the chromatography column and the detector;

controlling the injection valve to switch into fluid communication with the first fluid supply system, and controlling the first fluid supply system to provide a driving force to drive the first fluid to the injection valve; and controlling the injection valve to switch such that the second fluid supply system, the injection valve and the chromatography column are in fluid communication sequentially, and controlling the second fluid supply system to provide a driving force to drive the second fluid to the injection valve, while causing the second fluid to push the first fluid to the chromatography column and the detector.

18. The analysis method of claim 11, further comprising: controlling the injection valve to switch into fluid communication with the first fluid supply system, and controlling the first fluid supply system to provide a driving force to drive a cleaning liquid to clean a loading pipeline, which comprises a pipeline for loading the sample to be tested or loading the first fluid.

* * * * *